Jan. 15, 1963  M. L. HOOVER  3,073,464
MINE HAULAGE VEHICLE
Filed May 11, 1959  2 Sheets-Sheet 2

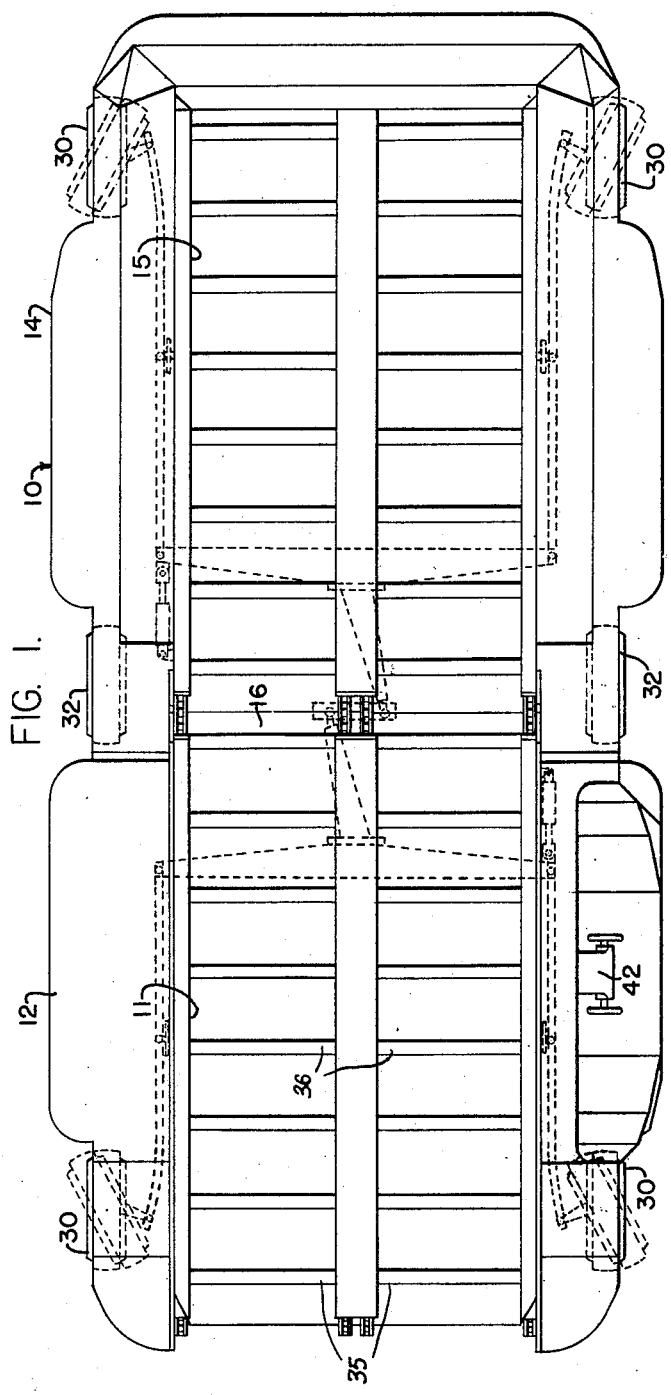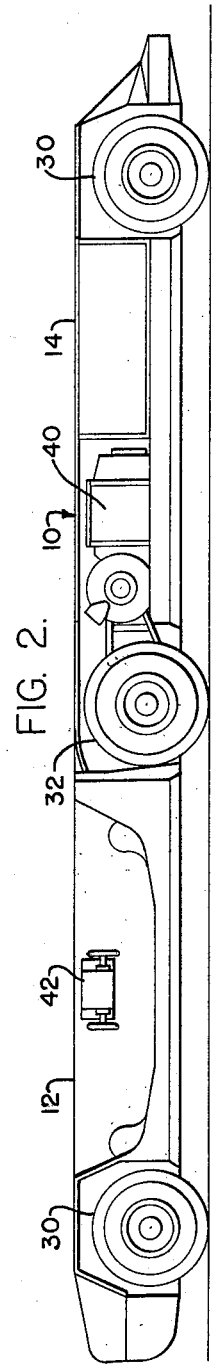

INVENTOR:
MERLE L. HOOVER
BY
ATTORNEY

United States Patent Office 3,073,464
Patented Jan. 15, 1963

3,073,464
MINE HAULAGE VEHICLE
Merle L. Hoover, Franklin, Pa., assignor to Joy Manufacturing Company, Pittsburgh, Pa., a corporation of Pennsylvania
Filed May 11, 1959, Ser. No. 812,278
2 Claims. (Cl. 214—83.36)

This invention relates to a mine haulage vehicle and more particularly to a mine haulage vehicle having a traction aid.

Heretofore it has been known to provide an elongated articulated mine haulage vehicle, such as that shown in the United States Patent No. 2,962,176, entitled Low Height Shuttle Car, issued November 29, 1960, which has been assigned to the same assignee as this invention, in which a pair of traction wheels are provided on a generally centrally located axle and steering wheels are provided at each end of the vehicle. With such a structure the unevenness of the mine floors over which the vehicle is used makes it difficult under certain operating conditions to obtain sufficient traction for the vehicle at the central traction wheels.

Accordingly, one object of this invention is to provide a new and improved mine haulage vehicle in which means are provided whereby the traction may be varied as the conditions under which the vehicle is operated are varied.

Another object of this invention is to provide the traction aid near the articulated center of an articulating multi-wheeled shuttle car to obtain a variable weight distribution on the traction wheels for adequate driving traction.

A specific object of the invention is to mount a hydraulic jack near the articulating center of the body sections to increase the traction on the driven traction wheels of mine haulage vehicle.

Another specific object of the invention is to mount a hydraulic actuated pinion gear device near the articulating center of the body sections to increase the traction on the driven traction wheels.

These and other objects of this invention will become more apparent upon consideration of the following detailed description of a preferred embodiment thereof, when taken in conjunction with the following drawings, in which:

FIGURE 1 is a top plan view of a mine haulage vehicle having a traction aid device constructed in accordance with the principles of this invention;

FIGURE 2 is a side elevation view of the mine haulage vehicle as shown in FIGURE 1;

Figure 3:
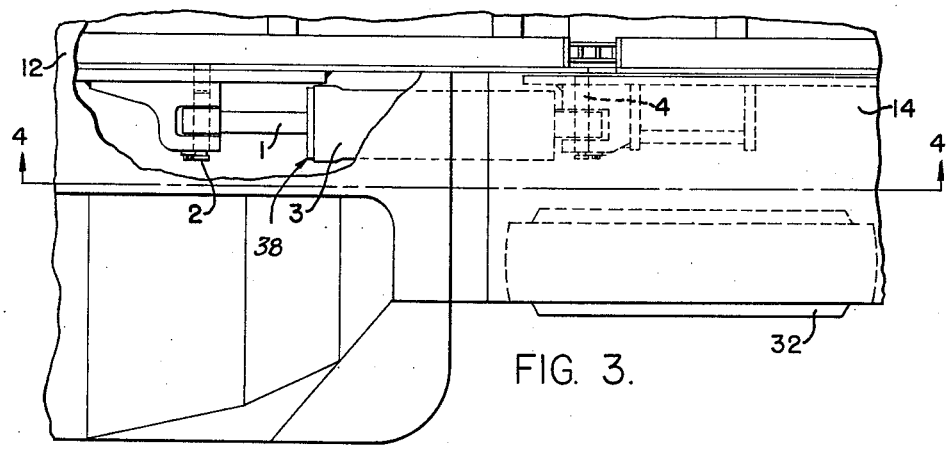
FIGURE 3 is a fragmentary plan view on an enlarged scale in the same plane as FIGURE 1.

Referring to the drawings, it will be noted that a mine haulage vehicle of the type with which this traction aid is used, as shown by FIGS. 1 and 2, comprises a material carrying body 10 divided into two relatively articulating elongated body sections 12 and 14 which are hinged together at pivot means 16, said pivot means extends transversely across the center region of the body 10 as shown in FIGS. 1 and 3. Said elongated articulating sections 12 and 14 have centrally disposed chambers 11 and 15 which cooperate to provide material receiving compartments and for mounting of an endless conveyor means 35 as more specifically disclosed in the United States Patent No. 2,962,176, issued November 29, 1960. As disclosed more specifically in the above identified application, the endless conveyor means 35 with scraper flights 36 extends along the compartment bottom substantially throughout the entire length of the vehicle. The bottom of the compartment is provided with a conveyor return chamber in a manner well known in the art. In lieu of the endless conveyor means 35, it will be evident that various other conventional forms of conveyors may be employed, but in all forms it is desirable that the point of articulation between the body parts be disposed below the effective conveying portion of the conveyor near the intermediate traction wheels.

The material carrying body 10 is provided with end steerable wheels 30 located at the ends of the elongated body sections, and centrally located thereof intermediate traction motor driven wheels 32 disposed on the axis (FIG. 4) near the axis of articulation 16 between the elongated body sections 12 and 14. The steering controls 42 (FIG. 2) are similar to that disclosed in the United States Patent No. 2,962,176, and accordingly are not disclosed in detail.

The articulating pivot means 16 which joins the two body sections permits the two body sections to articulate relative to one another so that the end steerable wheels 30 and the intermediate traction wheels 32 may conform to the mine floor.

Figure 4:
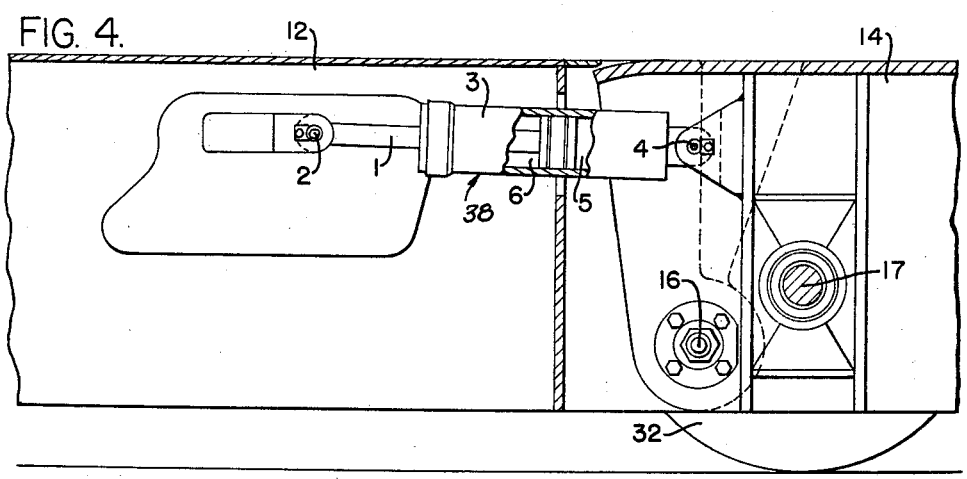
FIGURE 4 is an enlarged cross sectional view disclosing the traction aid device of the mine haulage vehicle shown in FIGURE 1 taken substantially along line 4—4 of FIGURE 3.

In order to provide proper force and weight distribution on the two body sections and their respective wheels a traction aid in the form of pressure producing means such as a hydraulic jack 38 (as shown in FIGS. 3 and 4) is mounted between body sections 12 and 14 as more specifically explained hereinafter. It is to be noted that one traction aid is mounted on each side of the body sections above the traction wheels, however, only one will be described since both are made and operated in the same manner.

A piston rod 1 of the jack 38 (FIG. 4) is pivotally mounted at its end on the upper body section 12 above the pivot means by stud means 2 thus fixedly connecting the rod to the one body section. Cylinder 3 of the jack 38 is pivotally mounted by stud means 4 to the other upper body section 14 above the traction wheel 32. Thus in addition to body sections 12 and 14 being connected by pivot means 16 they are also connected by the piston rod 1 and cylinder 3. To better understand the principles involved the following is presented. Pressure fluid introduced to the head end 5 (FIG. 4) of cylinder 3 will cause an opposite reaction to the body sections about pivot reaction means 16, tending to rotate body section 14 clockwise and body section 12 counterclockwise. On the other hand introduction of fluid means in chamber 6 would tend to produce the opposite reaction; namely, rotate body section 12 clockwise and body section 14 counterclockwise. In actual practice the amount of movement is sufficient to provide a force change and weight distribution on the tire wheels. Thus in introducing fluid pressure to chamber 6 a greater force reaction is developed on traction wheels 32 while relieving the force to a limited extent on the steerable wheels 30.

Figure 6:
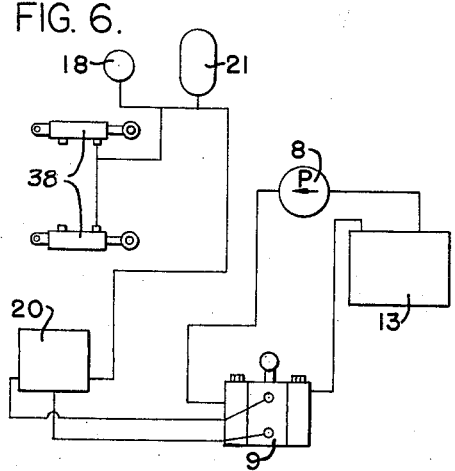
FIGURE 6 is a schematic representation of a hydraulic control circuit for the traction aid for use in a mine haulage vehicle as shown in FIGURE 1.

The flow diagram is illustrated by FIGURE 6 wherein pump 8 delivers pressurized fluid to control valve 9. In the initial position, control valve 9 channels the fluid pressure through pilot check valve 20 to the piston rod end of cylinder 3 and to the accumulator 21. The pressurized fluid as explained above tends to pivot the body sections about pivot axis 16 to increase the reactive force on the traction wheels 32. The weight of the load in the body sections counteracts the force exerted by the pressurized fluid. When control valve 9 is set in its second position the pilot check valve 20 relieves the pressurized cylinder and exhausts the system to reservoir 13 via the control valve. The details of the control system are conventional structures well known in the art and accordingly have not been detailed. Pressure gauge 18 indicates the amount of pressure in the system. The accumulator 21 provides the necessary flexible floating action to maintain the pressurized cylinder under pressure when traveling over uneven ground.

Figure 5:
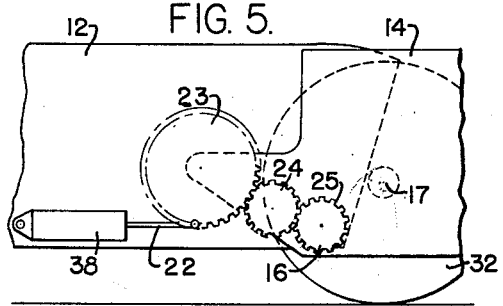
FIGURE 5 is a diagrammatic view of a modified form of the traction aid device.

In the embodiment of FIG. 5 the modification provides a variation in the traction aid wherein a piston and cylinder arrangement similar to the previous embodiment is mounted adjacent the pivot means 16 of the two elongated body sections wherein the forward portion of the piston rod is in the form of a rod 22 that reciprocates due to pressure changes in the jack 38.

The reciprocable rod 22 has its forward end pivotally connected to rotatable spur gear 23 which in turn is journaled on body section 14. Gear 23 meshes with idler spur gear 24 which is rotatably journaled on body section 14. Idler gear 24 meshes with stationary reactive gear 25 that is fixed to body section 14. Thus as fluid pressure is introduced to the piston rod end of cylinder 3, rod 22 rotates gear 23 which together with gear 24 tends to pivot body section 14 counterclockwise. In the above discussion body section 14 was mentioned to pivot whereas the reactive forces set up by the hydraulic jack 38 is to provide a force change and weight distribution on the tire wheels and the actual movement is negligible. Essentially the mode of operation is similar when either traction aid is employed.

The general mode of operation of the improved mine haulage vehicle is as follows. The machine is propelled by motor 40 supplying the power for the traction wheels 32 with steering means not shown guiding the vehicle via wheels 30. As the mine vehicle traverses the mine floor, control pump 8 via valve 9 pressurizes the rod end of cylinder 3 thus creating a greater traction force on wheels 32 as explained more fully above. Thus as the vehicle traverses the mine floor, greater traction is provided for the drive wheels maintaining proper weight distribution.

While there are in this application specifically described one form and a modification which the invention may assume in practice, it will be understood that this form and modification of the same are shown for purposes of illustration and that the invention may be further modified and embodied in various other forms without departing from its spirit or the scope of the applied claims.

What I claim as new and desire to secure by Letters Patent is:

1. An articulated mine haulage vehicle comprising a pair of interconnected body sections having all ends open with the adjacent ends open to each other to define a continuous passage floor in said body sections; said body sections have upwardly extending side portions; conveying means mounted in said body sections for cooperating with said floor passage for moving material over said floor and adapted to convey material continuously through said body sections for storage, receiving and discharge purposes; pivot means connecting said body sections at said adjacent ends for pivotal movement through an arc relative to each other; a pair of traction wheels mounted on one of said body sections adjacent said pivot means; steerable supporting wheels at the respective ends remote from said adjacent ends of said interconnected body sections; means mounted on one of said body sections for driving said traction wheels; and pressurized means located adjacent said pivot means operatively connecting said upwardly extending side portions of the respective said body sections for biasing said opposite ends of said body sections toward each other for increasing the load onto said traction wheels.

2. An articulated mine haulage vehicle as set forth in claim 1 wherein said pressurized means has an accumulator connected thereto to cushion the variations in said pressurized means due to variations in load characteristics as said wheels traverse a ground surface that is uneven and said pressurized means including selectively operable means for rendering said pressurized means inoperative or operative.

References Cited in the file of this patent
UNITED STATES PATENTS

| | | |
|---|---|---|
| 2,633,366 | Armington | Mar. 31, 1953 |
| 2,663,375 | Caldwell | Dec. 22, 1953 |
| 2,833,556 | Kling | May 6, 1958 |
| 2,899,004 | Simmons | Aug. 11, 1959 |
| 2,962,176 | Russell | Nov. 29, 1960 |